(12) United States Patent
Randell et al.

(10) Patent No.: US 7,320,045 B2
(45) Date of Patent: Jan. 15, 2008

(54) AUTOMATIC DETECTION OF THE BIT WIDTH OF A DATA BUS

(75) Inventors: Jerrold R. Randell, Waterloo (CA); Richard C. Madter, Puslinch (CA); Wei Yao Huang, Kitchener (CA)

(73) Assignee: Research In Motion Limited, Waterloo, Ontario (CA)

( * ) Notice: Subject to any disclaimer, the term of this patent is extended or adjusted under 35 U.S.C. 154(b) by 34 days.

(21) Appl. No.: 11/048,761

(22) Filed: Feb. 3, 2005

(65) Prior Publication Data

US 2005/0180206 A1 Aug. 18, 2005

Related U.S. Application Data

(60) Provisional application No. 60/542,012, filed on Feb. 5, 2004.

(51) Int. Cl.
*G06F 1/00* (2006.01)

(52) U.S. Cl. ............... 710/307; 710/16; 710/11; 711/171

(58) Field of Classification Search ........ 710/306–315, 710/104–107, 8–19; 711/5, 170–173; 365/185.01, 365/185.02
See application file for complete search history.

(56) References Cited

U.S. PATENT DOCUMENTS

| | | | |
|---|---|---|---|
| 4,766,538 A * | 8/1988 | Miyoshi | 710/307 |
| 5,168,562 A | 12/1992 | Estepp et al. | |
| 5,255,374 A | 10/1993 | Aldereguia et al. | |
| 5,617,546 A * | 4/1997 | Shih et al. | 710/307 |
| RE36,052 E * | 1/1999 | Kobayashi et al. | 710/307 |
| 6,101,565 A | 8/2000 | Nishtala et al. | |
| 6,263,399 B1 * | 7/2001 | Hwang | 711/103 |
| 6,324,666 B1 | 11/2001 | Nakamoto | |
| 6,449,193 B1 * | 9/2002 | Love et al. | 365/189.01 |
| 6,735,661 B2 * | 5/2004 | Gelke et al. | 710/307 |
| 2004/0128465 A1 * | 7/2004 | Lee et al. | 711/171 |

FOREIGN PATENT DOCUMENTS

| | | |
|---|---|---|
| EP | 1367496 A2 | 12/2003 |
| EP | 1378914 A2 | 1/2004 |

* cited by examiner

*Primary Examiner*—Khanh Dang
*Assistant Examiner*—Raymond N Phan
(74) *Attorney, Agent, or Firm*—Dimock Stratton LLP; Jenna L. Wilson

(57) ABSTRACT

A device employs a method for determining the data bus width of a non-volatile memory, such as NAND flash memory. The method performs at least two read operations on the non-volatile memory so as to test the changing of selected data bits. The method may be performed such that weak pull down and pull up operations are performed to test the data outputs of the non-volatile memory.

17 Claims, 15 Drawing Sheets

| Transaction | 15 Cmd Val | 14 - | 13 Data Write | 12 Data Cycle Req'd | 11 Reg To Cell | 10 Cell To Reg | 9 Row Addr Req'd | 8 Col Addr Req'd | Command Code (in Hexadecimal format) |
|---|---|---|---|---|---|---|---|---|---|
| Reset | 1 | X | X | 0 | 0 | 1* | 0 | 0 | FF |
| Read Mode 1 | 1 | X | 0 | 1 | 0 | 1 | 1 | 1 | 00 |
| Read Mode 2 | 1 | X | 0 | 1 | 0 | 1 | 1 | 1 | 01 |
| Read Mode 3 | 1 | X | 0 | 1 | 0 | 1 | 1 | 1 | 50 |
| Serial Data In | 1 | X | 1 | 1 | 0 | 0 | 1 | 1 | 80 |
| Auto Program (True) | 1 | X | X | 0 | 1 | 0 | 0 | 0 | 10 |
| Auto Program (Dummy) | 1 | X | X | 0 | 1 | 0 | 0 | 0 | 11 |
| Auto Program (Multi Block) | 1 | X | X | 0 | 1 | 0 | 0 | 0 | 15 |
| Auto Block Erase | 1 | X | X | 0 | 0 | 0 | 1 | 0 | 60 |
| Auto Block Erase (True) | 1 | X | X | 0 | 1 | 0 | 0 | 0 | D0 |
| Status Read 1 | 1 | X | 0 | 1 | 0 | 0 | 0 | 0 | 70 |
| Status Read 2 | 1 | X | 0 | 1 | 0 | 0 | 0 | 0 | 71 |
| ID Read 1 | 1 | X | 0 | 1 | 0 | 1** | 0 | 1 | 90 |
| ID Read 2 | 1 | X | 0 | 1 | 0 | 1** | 0 | 1 | 91 |

FIG. 4

AUTOMATIC DETECTION OF THE BIT WIDTH OF A DATA BUS

REFERENCE TO PRIOR APPLICATIONS

This application claims priority from U.S. application Ser. No. 60/542,012, filed Feb. 5, 2004.

BACKGROUND

1. Technical Field

This invention relates to data processing devices. In particular, this invention relates to a system and method for detecting the data bus width of a memory device.

2. Description of Related Art

Handheld data processing devices, sometimes known as "personal digital assistants", are becoming very popular. Such devices have the ability to store a significant amount of data, including calendar, address book, tasks and numerous other types of data for business and personal use. Most handheld data processing devices have the ability to connect to a personal computer for data exchange, and many are equipped for wireless communications using, for example, conventional email messaging systems.

Cost and space are two significant limiting parameters in handheld data processing devices. As a general rule, reducing the number of chips required by the device also reduces the cost and size of the device, and in some cases energy consumption.

A typical handheld processing device has a processor for processing the data; a non-volatile memory storage device in the form of a NOR flash chip, and a volatile memory storage device such as SRAM. The NOR flash retains data when no power is being supplied to the chip, and the SRAM caches data from the flash memory during operation of the device. Accordingly, the processor in such handheld data processing devices is designed and configured to read data from and write data to SRAM and NOR flash memory devices.

Another available type of non-volatile memory, known as NAND flash, is less expensive and contains more memory than a comparable NOR flash device. However, whereas NOR flash memory is read and written to one byte or word or other device width at a time, like random access memory (RAM), NAND flash memory must be read and written to in blocks or "sectors" of data, like a disk drive. It is therefore not possible for an existing NOR flash type processor in a handheld data processing device to utilize a NAND flash memory, because the architecture of the processor requires that it process bytes of data rather than sectors. If a NAND flash were coupled to such a processor, not only would the processor be unable to process data during normal operation of the device, it would not be able to boot up because it would not be able to access the specific sequence of instruction bytes constituting the bootup routine. In order to reconfigure the processor to be able to boot and run using a NAND flash chip, the architecture of the processor would need to be drastically changed, which is an extremely expensive and laborious process.

It would accordingly be advantageous in such a device to provide a memory controller interface that supports NAND flash memory, to take advantage of the increased capacity and lower cost without having to redesign the main processor. Moreover, since NAND flash memory is available with either an 8-bit data bus or a 16-bit data bus, it would be advantageous to be able to use either form of NAND flash in the device, as circumstances may dictate. However, since the processor code—including the boot code—is stored in the NAND flash memory, the processor program code cannot be used to configure the data bus word size or "width," because the data bus width must be determined before the processor code starts to run in order for the code to be accessed correctly when read out of NAND flash. In other words, the processor can only boot up from code stored in flash memory if the width of the data bus is known, so the memory controller can properly process the data as it is read out of the memory device.

It is possible to utilize a dedicated input pin to signal the data bus width. However, this requires additional space on the memory controller chip and complicates the circuit board topography.

SUMMARY

In accordance with an embodiment of the invention, a method for automatically detecting the bit width of a data bus is provided comprising the steps of performing a plurality of data reads, comparing at least some of the plurality of data reads to others of the plurality of data reads, and i) if a portion of data remains the same in each of the compared plurality of data reads, configuring to a first data bus width, or ii) if the portion of data does not remain the same in any of the compared plurality of data reads, configuring to a second data bus width, wherein the first data bus width is not a same size as the second data bus width. Yet another aspect is that the method only performs read operations, and that the portion of data is a most significant portion of data or a selection of noncontiguous bits. In a further aspect, the plurality of data reads comprises a plurality of consecutive reads starting from address location zero, and the number of data reads is sufficient to determine that the most significant portion of one of the plurality of data reads differs from the most significant portion of a previous one of the plurality of data reads.

In accordance with a further aspect, a system is provided for automatically detecting the bit width of a memory data bus, comprising a memory controller interface in communication with the processor; a memory device in communication with the memory controller interface, the memory device comprising a data bus; the memory controller interface being configured to perform a plurality of data reads on the memory device such that if a portion of data remains the same in each of the compared plurality of data reads, the memory controller interface self-configures to a first data bus width, and if the portion of data does not remain the same in any of the compared plurality of data reads, the memory controller interface self-configures to a second data bus width, wherein the first data bus width is not a same size as the second data bus width. In a further aspect, for example, the first data bus width is 8 bits, and a second data bus width is 16 bits, and further the memory controller interface is configured to compare the most significant 8-bit portion of each of the plurality of data reads obtained for each data read, such that the most significant 8-bit portion changes between two consecutive data reads of the plurality of data reads, the memory controller interface self-configures to the second data bus width, and if the most significant 8-bit portion does not change, the memory controller interface self-configures to the first data bus width.

Yet another aspect is that the memory controller interface may be hardcoded into a processor, and the memory device may be NAND flash memory. Still a further aspect is that a method for automatically detecting the bit width of a data bus is provided, comprising the steps of performing a plurality of data reads, comparing a first portion and a second portion of at least some of the plurality of data reads to others of the plurality of data reads, and i) if a first portion and a second portion of data in one of the plurality of data reads is different from the first portion and the second portion of data from another of the plurality of data reads, configuring to a first data bus width; ii) if a first portion of data in one of the plurality of data reads is different from the first portion of data from another of the plurality of data reads, and a second portion of data from the one of the plurality of data reads is the same as the second portions of data from the remaining of the plurality of data reads, configuring to a second data bus width; and iii) if a first portion and a second portion of data is the same as the first portions and second portions of data from the remaining of the plurality of data reads, configuring to a third data bus width.

BRIEF DESCRIPTION OF THE DRAWINGS

In drawings which illustrate by way of example only a preferred embodiment of the system.

FIG. 4 is a NAND Control Interface—Command Code Attributes table for the interface of FIG. 3.

DETAILED DESCRIPTION

Figure 1:
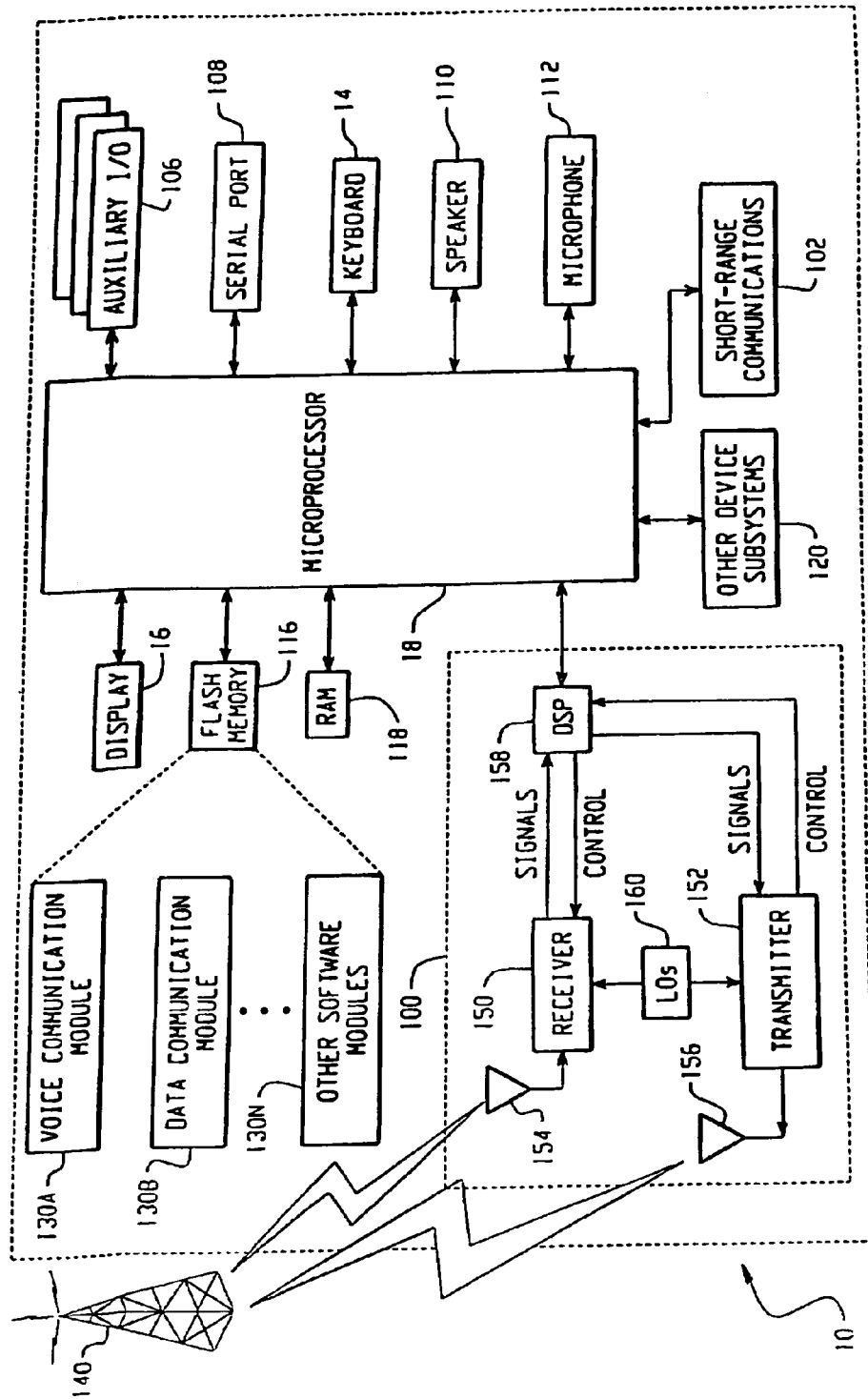
FIG. 1 is a block diagram of a system overview of a hand-held data processing device.
Figure 2:
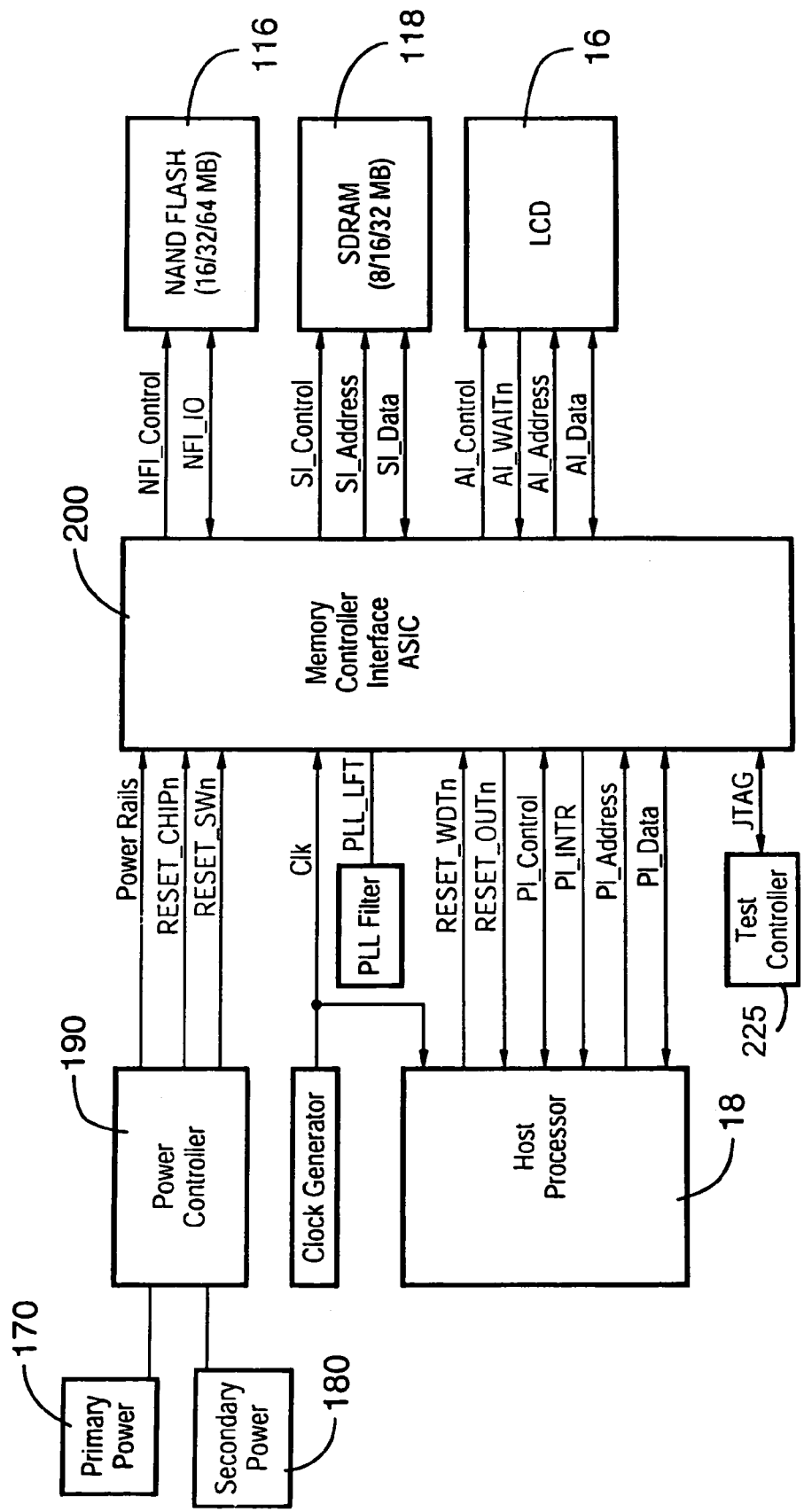
FIG. 2 is a system interface block diagram of a data processing device.
Figure 3A:
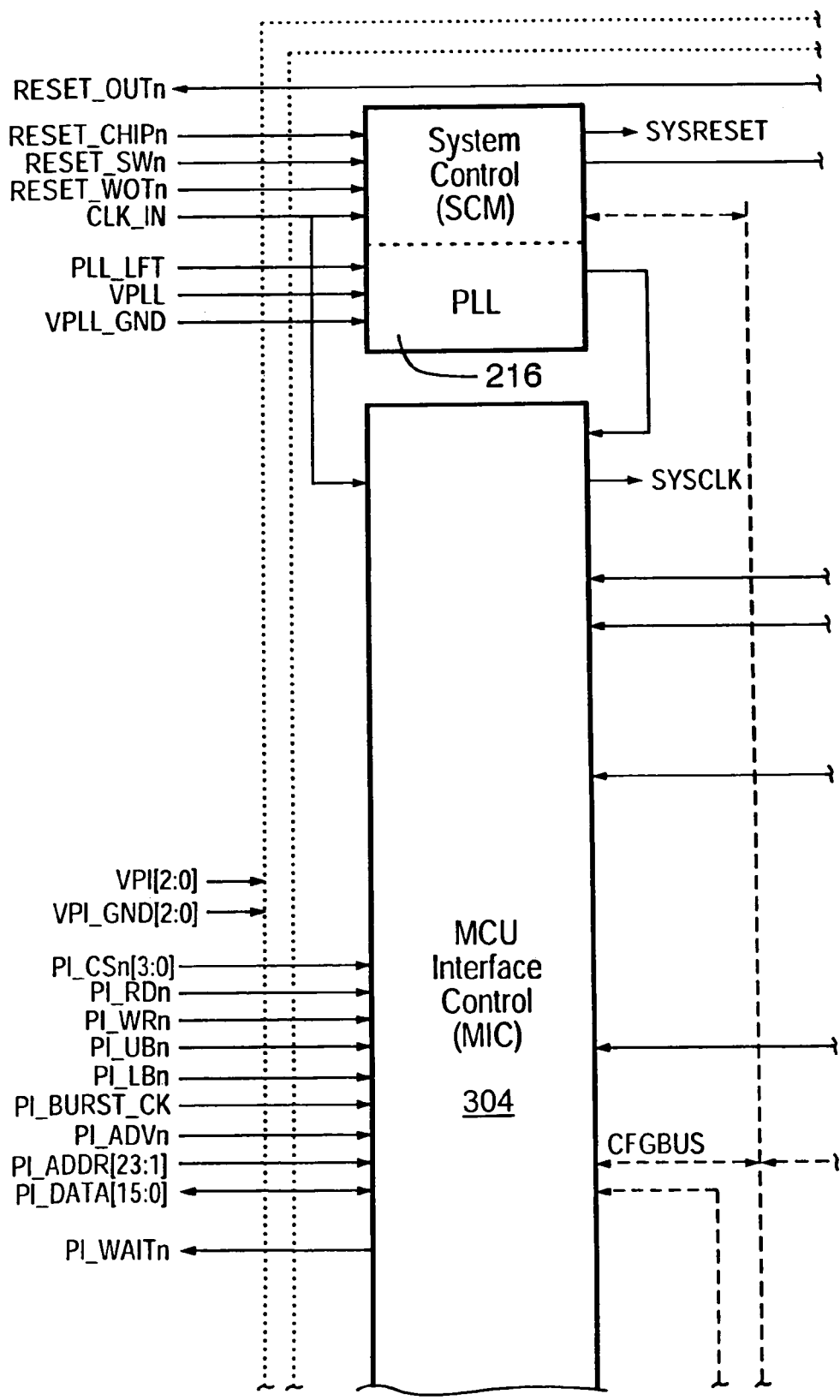
FIG. 3 is a detailed block diagram of the memory controller interface in the data processing device of FIG. 2.
Figure 3B:
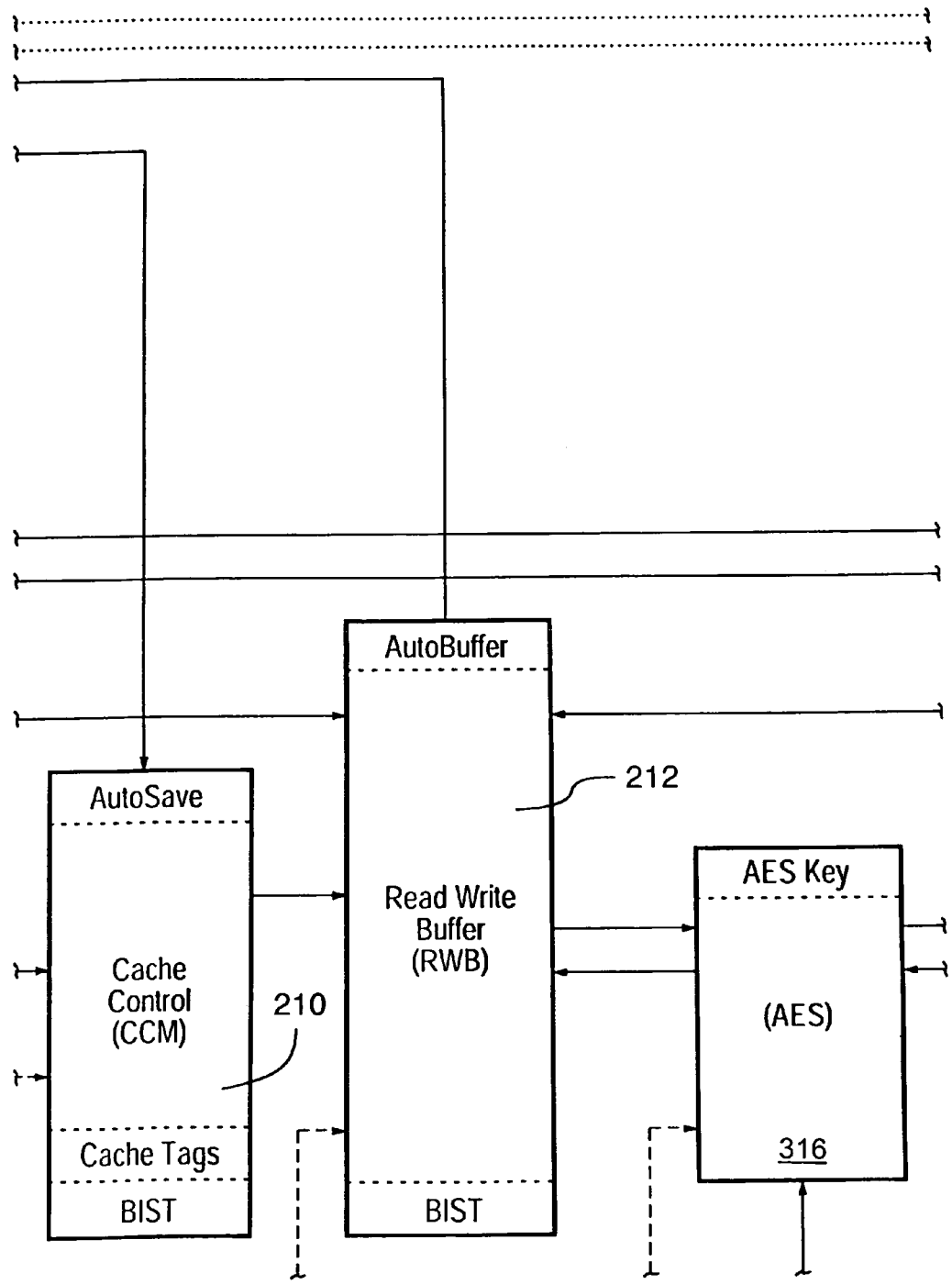
Figure 3C:
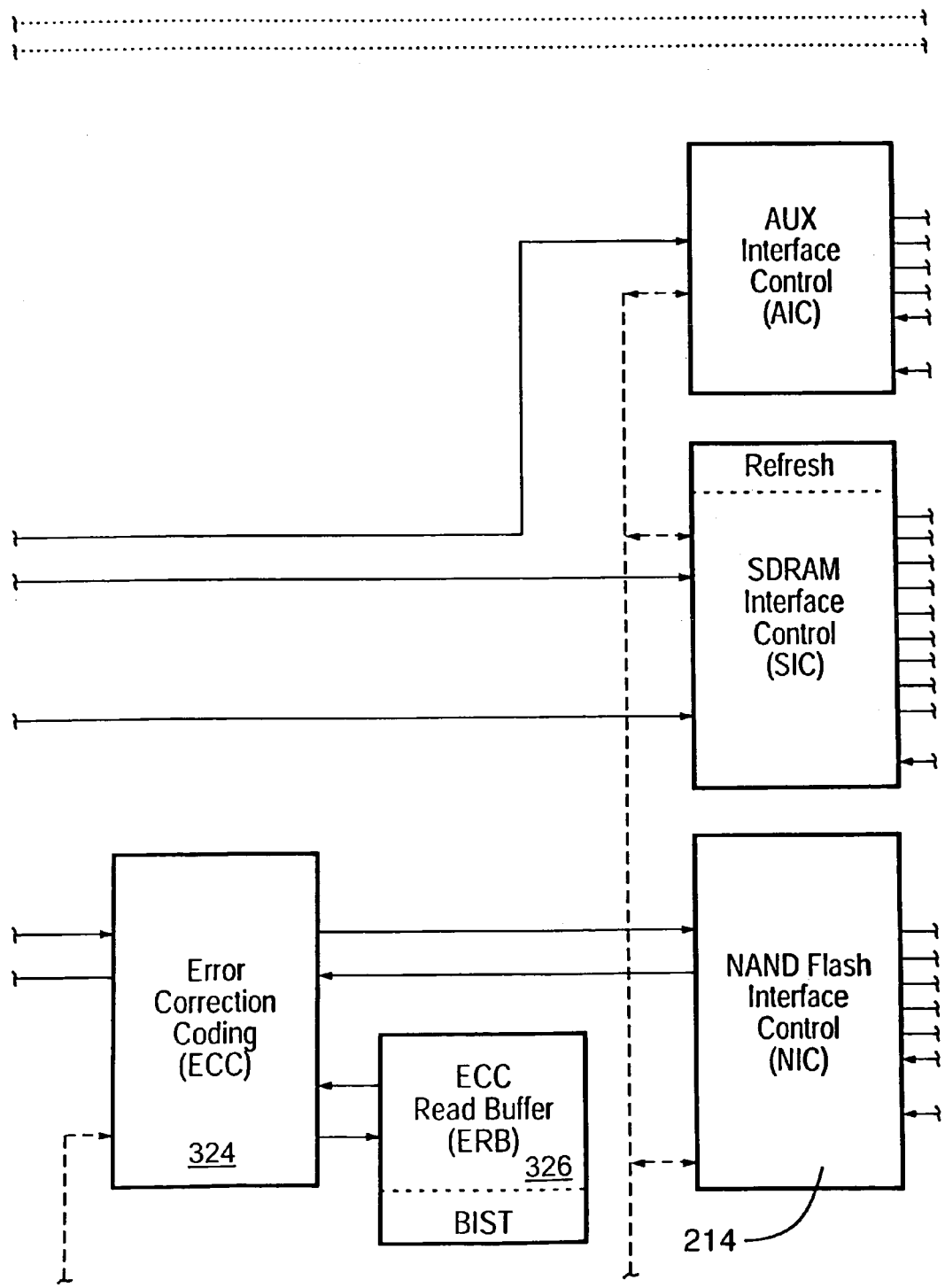
Figure 3D:
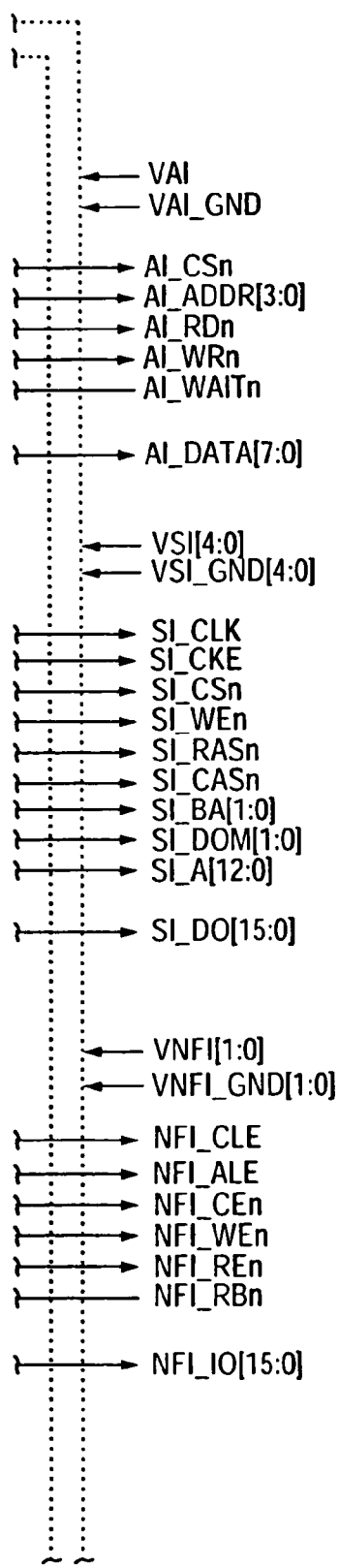
Figure 3E:
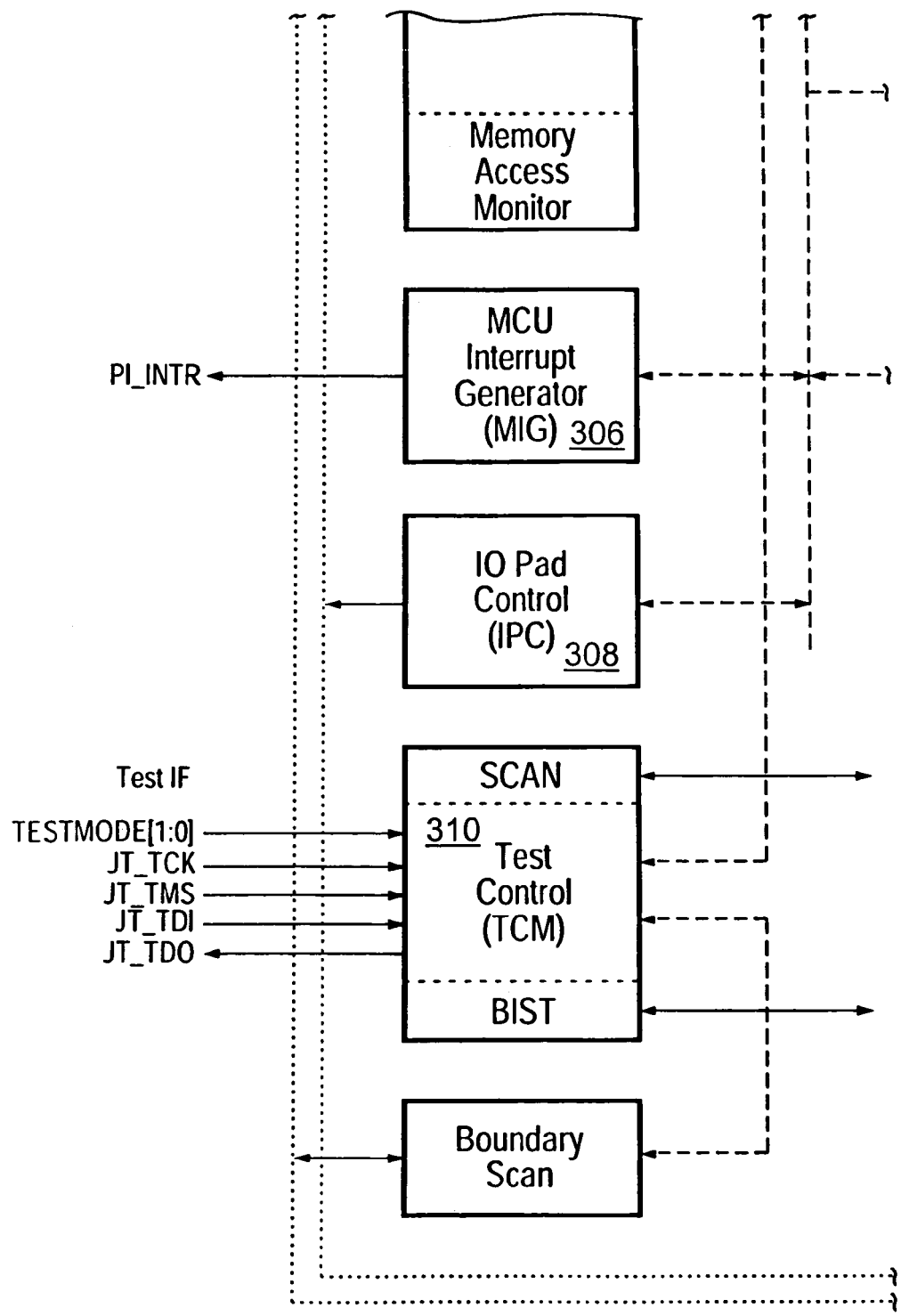
Figure 3F:
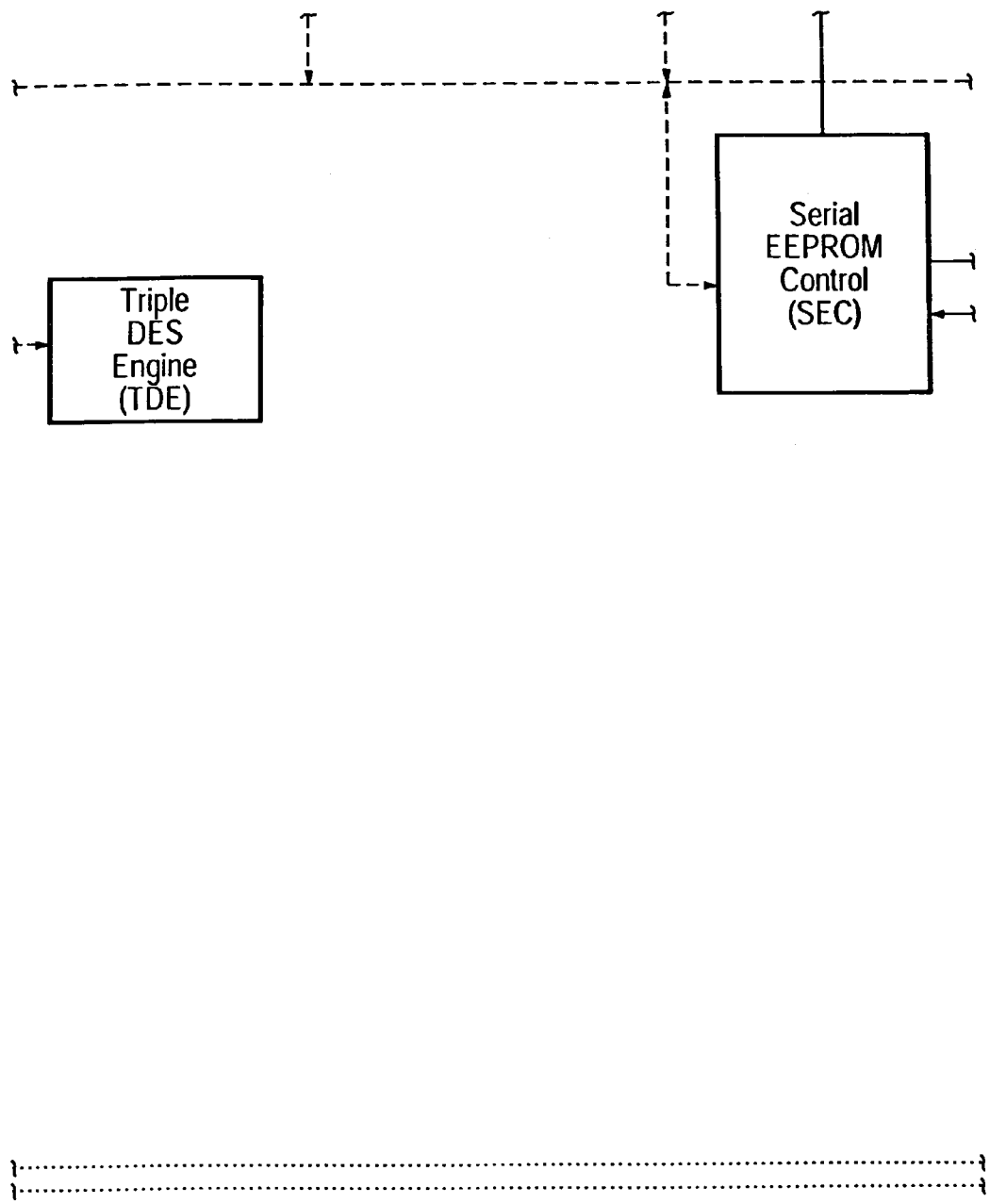
Figure 3G:
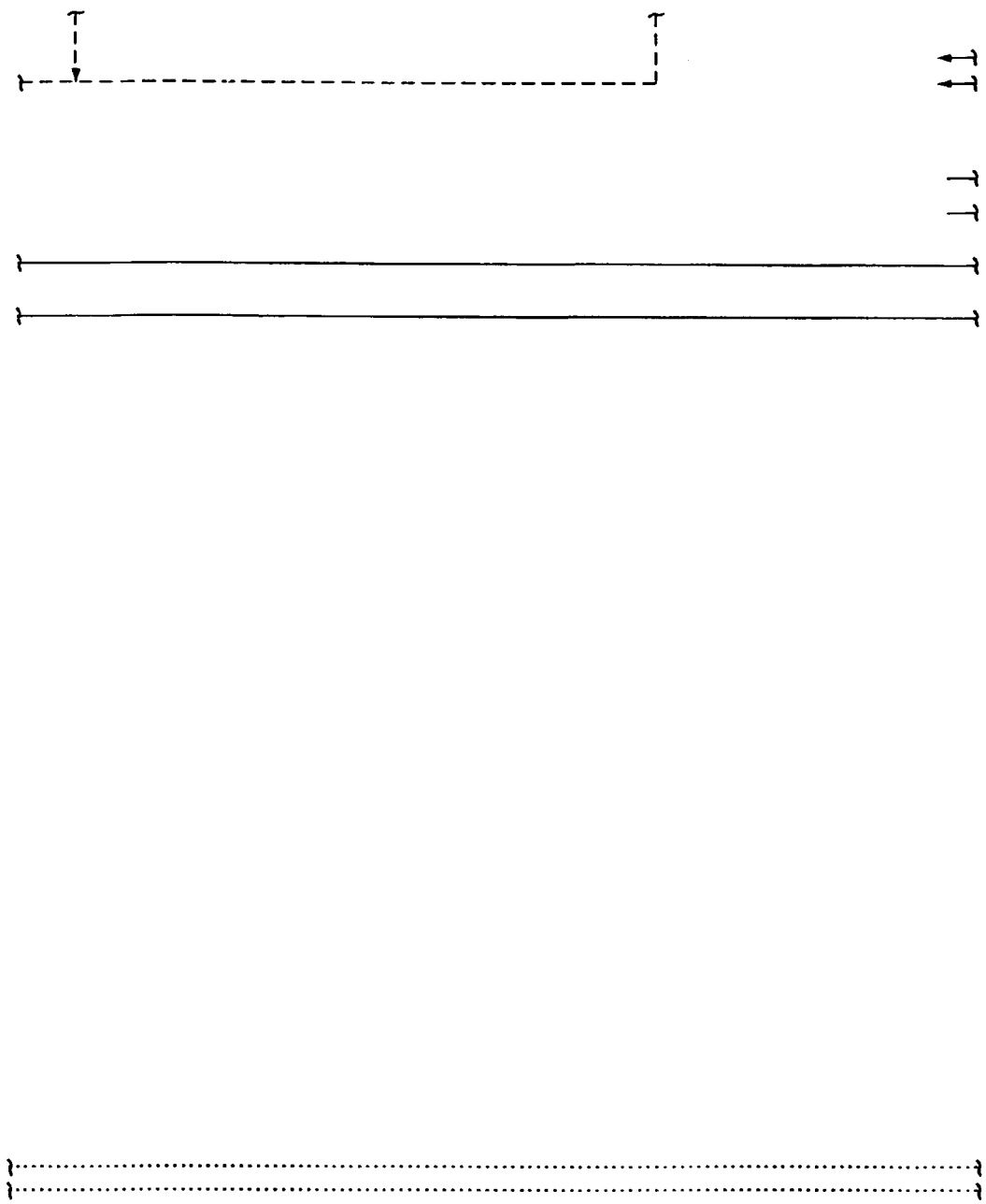
Figure 3H:
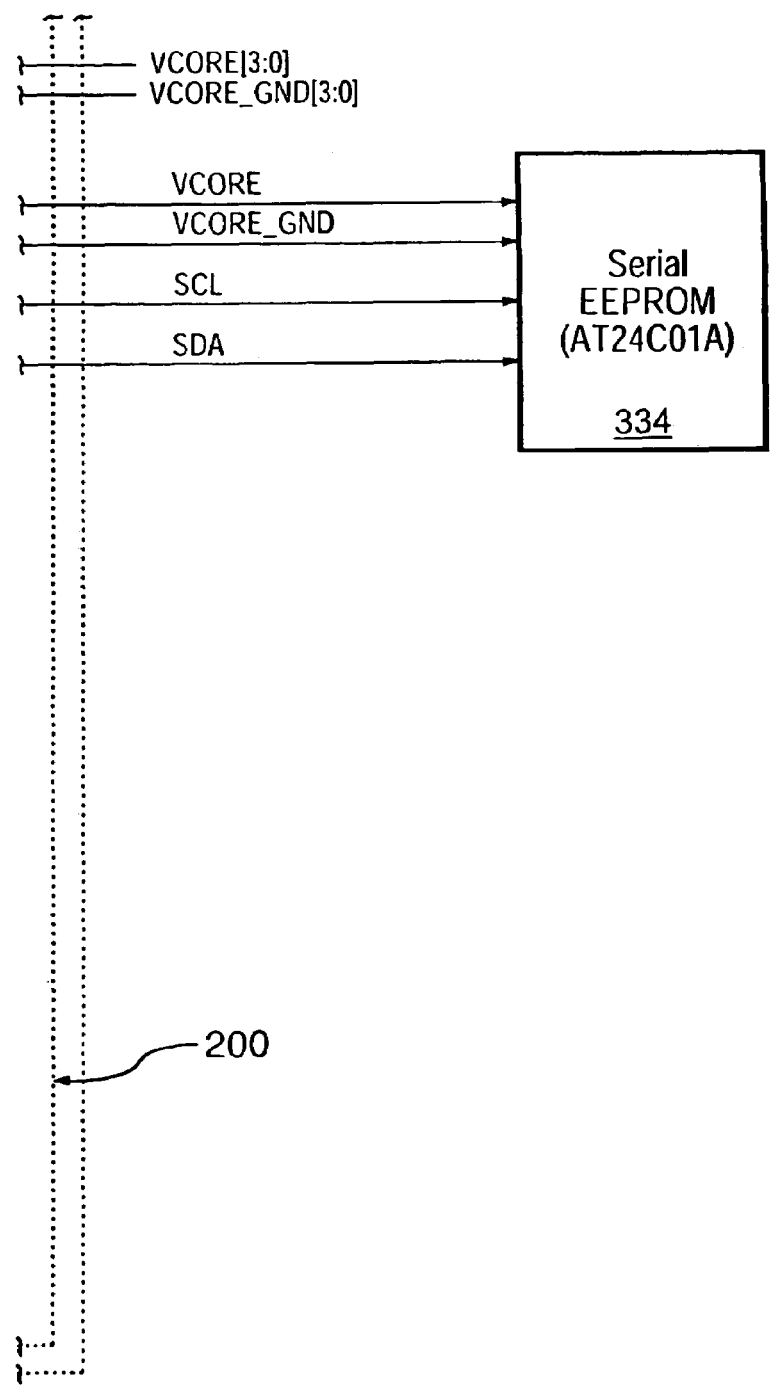
Figure 3I:
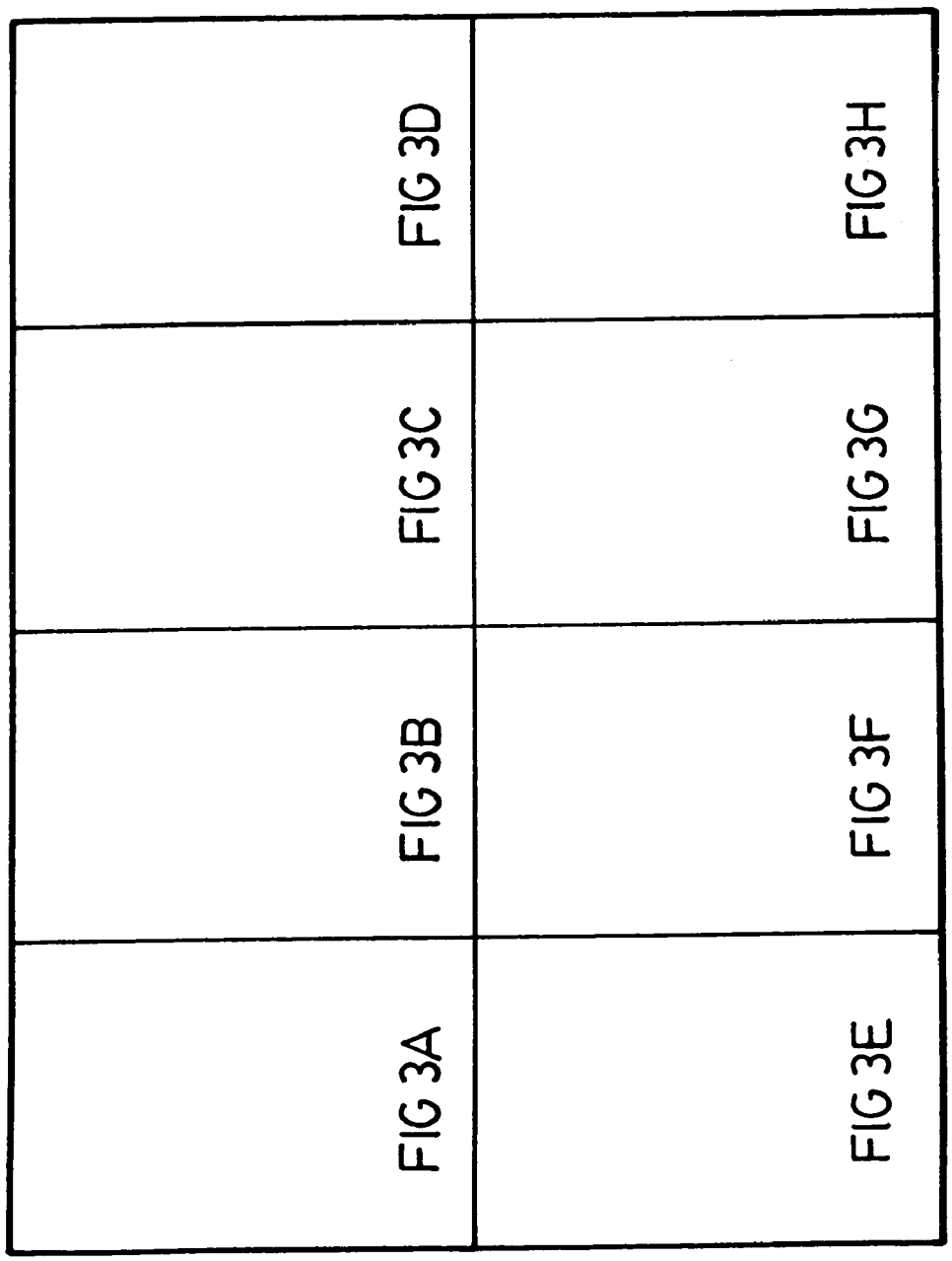

The system will be described in detail below, by way of example only, in the context of a hand-held data processing device having wireless communications capabilities as illustrated in FIGS. 1 to 3. However, it will be appreciated that the principles of the system apply to other data processing devices and the system is not intended to be limited thereby.

The present system relates to a method and handheld device for using the method for determining the data bus width of a non-volatile memory. The non-volatile memory may be a battery backed random access memory, a flash memory, or the like. The method tests the toggling of at least one bit in the data bus of the memory. In the case where there are two different sized data buses, the determination of a toggling action from the data outputs of a non-volatile memory from the most significant bits will establish that the data bus width of the non-volatile memory is the larger size. Conversely, the lack of toggling action of the data outputs of the non-volatile memory will establish that the data bus width of the non-volatile memory is of the lesser size.

The present system provides a method of automatically detecting the width of the data bus in hardware, before execution of the processor code begins, and a memory controller interface for performing the method. In the preferred embodiment, as shown in FIG. 2, the memory controller interface 200 is a separate interface chip, for example an application-specific integrated circuit (ASIC), and serves as an interface between the existing processor 18 and the memory, which for example may include a NAND flash memory chip 116 and SDRAM 118. The memory controller interface 200 contains detection hardware that on system reset executes a hardware initialization and self-configuration routine that performs a reset to NAND flash memory 116 and an automatic detection of the memory data bus width.

According to the system, during the hardware initialization and self-configuration routine the data input/output (IO) pads in the memory controller interface 200 default to bus hold mode and a NAND Interface Controller (NIC) 214 contained within the interface chip 200 defaults to an assumed 16-bit data width. To determine the actual data bus width of the memory device, the NIC 214 performs a plurality of consecutive reads, for example 16 reads, starting from address location zero, and compares the upper 8 bits of the data returned from each read. When an 8-bit NAND Flash device 116 is connected to the interface chip 200, the upper 8 bits of each read will be unconnected. Therefore, the upper 8 data IOs will remain constant (and equal to the reset value of the IOs) due to the bus hold functionality. However, when a 16-bit NAND Flash device 116 is connected to the interface chip 200 the most significant bytes will change value from the upper 8 bits of the previous read because the reads consist of host processor 18 instructions. If during any of the 16 reads, the most significant byte (MSB) of the data differs from that of the previous read, the NIC 214 remains in 16-bit mode and processes data from the NAND flash 116 accordingly. If the MSB from the 16 reads remain the same, the NIC 214 reconfigures itself to the 8-bit mode.

Autodetection of the data bus width by the interface chip 200 avoids the need for a dedicated input pin to select the data bus width.

It will be appreciated that the system can alternatively be hard-coded directly into the processor 18, in which case a separate memory controller interface 200 to the NAND flash 116 may be unnecessary.

As shown in FIG. 1, in an exemplary embodiment, the hand-held mobile communication device 10 includes a housing, an input device 14 and an output device 16. The input device shown is a keyboard 14, and the output device shown is a display 16, which is preferably a full graphic LCD. Other types of input and output devices may alternatively be utilized. A processor 18, which is shown schematically in FIG. 1, is contained within the housing and is coupled between the keyboard 14 and the display 16. The processor 18 controls the operation of the display 16, as well as the overall operation of the mobile device 10, in response to actuation of keys on the keyboard 14 by the user.

The housing may be elongated vertically, or may take on other sizes and shapes (including clamshell housing structures). The keyboard may include a mode selection key, or other hardware or software for switching between text entry and telephony entry.

In addition to the processor 18, other parts of the mobile device 10 are shown schematically in FIG. 1. These include a communications subsystem 100; a short-range communications subsystem 102; the keyboard 14 and the display 16, along with other input/output devices 106, 108, 110 and 112; as well as memory devices 1116, 118 and various other device subsystems 120. The mobile device 10 is preferably a two-way RF communication device having voice and data communication capabilities. In addition, the mobile device 10 preferably has the capability to communicate with other computer systems via the Internet.

Operating system software executed by the processor 18 is preferably stored in a persistent store, such as a flash memory 116, but may be stored in other types of memory devices, such as a read only memory (ROM) or similar storage element. In addition, system software, specific device applications, or parts thereof, may be temporarily loaded into a volatile store, such as a random access memory (shown here as SDRAM 118). Communication signals received by the mobile device may also be stored to the SDRAM 118.

The processor 18, in addition to its operating system functions, enables execution of software applications 130A-130N on the device 10. A predetermined set of applications that control basic device operations, such as data and voice communications 130A and 130B, may be installed on the device 10 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 140. Preferably, the PIM data items are seamlessly integrated, synchronized and updated via the wireless network 140 with the device user's corresponding data items stored or associated with a host computer system.

Communication functions, including data and voice communications, are performed through the communication subsystem 100, and possibly through the short-range communications subsystem. The communication subsystem 100 includes a receiver 150, a transmitter 152, and one or more antennas 154 and 156. In addition, the communication subsystem 100 also includes a processing module, such as a digital signal processor (DSP) 158, and local oscillators (LOs) 160. The specific design and implementation of the communication subsystem 100 is dependent upon the communication network in which the mobile device 10 is intended to operate. For example, a mobile device 10 may include a communication subsystem 100 designed to operate with the Mobitex™, Data TAC™ or General Packet Radio Service (GPRS) mobile data communication networks and also designed to operate with any of a variety of voice communication networks, such as AMPS, TDMA, CDMA, PCS, GSM, etc. Other types of data and voice networks, both separate and integrated, may also be utilized with the mobile device 10.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 10 may send and receive communication signals over the communication network 140. Signals received from the communication network 140 by the antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 140 are processed (e.g. modulated and encoded) by the DSP 158 and are then provided to the transmitter 152 for digital to analog conversion, frequency up conversion, filtering, amplification and transmission to the communication network 140 (or networks) via the antenna 156.

In addition to processing communication signals, the DSP 158 provides for control of the receiver 150 and the transmitter 152. For example, gains applied to communication signals in the receiver 150 and transmitter 152 may be adaptively controlled through automatic gain control algorithms implemented in the DSP 158.

In a data communication mode, a received signal, such as a text message or web page download, is processed by the communication subsystem 100 and is input to the processor 18. The received signal is then further processed by the processor 18 for an output to the display 16, or alternatively to some other auxiliary I/O device 106. A device user may also compose data items, such as e-mail messages, using the keyboard 14 and/or some other auxiliary I/O device 106, such as a touchpad, a rocker switch, a thumb-wheel, or some other type of input device. The composed data items may then be transmitted over the communication network 140 via the communication subsystem 100.

In a voice communication mode, overall operation of the device is substantially similar to the data communication mode, except that received signals are output to a speaker 110, and signals for transmission are generated by a microphone 112. Alternative voice or audio I/O subsystems, such as a voice message recording subsystem, may also be implemented on the device 10. In addition, the display 16 may also be utilized in voice communication mode, for example to display the identity of a calling party, the duration of a voice call, or other voice call related information.

The short-range communications subsystem enables communication between the mobile device 10 and other proximate systems or devices, which need not necessarily be similar devices. For example, the short-range communications subsystem may include an infrared device and associated circuits and components, or a Bluetooth™ communication module to provide for communication with similarly enabled systems and devices.

FIG. 2 is a system interface block diagram of a data processing device. The memory controller interface 200 interfaces with NAND flash memory 116, SDRAM 118, and liquid crystal display 16. The memory controller interface 200 is preferably an application specific integrated circuit and may be a field programmable gate array or other programmable logic device. A power module 190 provides power to the memory controller interface 200. Timing signals are provided by a clock generator. The memory controller interface 200 interfaces with a host processor 18. Other modules, such as a phase locked loop filter 220 and a test controller 225, may be used for timing, testing, and other functions.

FIG. 3 is a detailed block diagram of the memory controller interface 200 in the data processing device of FIG. 2. The power module 190 and phase locked loop filter 220 interface with the system control module 216. The test controller 225 interfaces with the test control module 310. The host processor 18 signals are managed by the microprocessor controller unit (MCU) interface control module 304. An interrupt generator 306 provides notice to the host processor 18 that the memory controller interface 200 has data, status, and/or instructions to send. An IO pad control module 308 permits control of drive strength, pull down, pull up, or other test operations on the IO signals. The memory controller interface 200 is implemented with a NIC 214 and may have other memory control interfaces 330, 328.

An interface 322 for a serial memory, such as a serial electrical programmable read only memory 334, may be provided. Other components within the memory controller interface 200 usually include a cache control manager 210, a read/write buffer 212, an encryption engine 316, an error correction coding module 324, and an error correction coding read buffer 326.

The system relates to a method of automatically detecting the width of the data bus in hardware, before execution of the processor code begins.

In a specific implementation of the memory interface controller, the NIC 214 supports 8 bit and 16 bit parts. On system reset, a hardware initialization routine performs a reset to NAND flash memory 116 and an automatic detection of the memory data bus width. The bus width detection circuit requires that on reset, the NAND flash interface data IO pads 321 default to "bus hold" mode and the NIC 214 configuration defaults to 16 bit mode. The bus hold mode implemented on the I/O pads 321 to maintain their prior state, with a weak pull-up or pull-down, is preferred as it provides the advantage of energy savings, depending upon the last received bit values. A constant pull-up or pull-down is sufficient for this purpose, but not essential.

Figure 5:
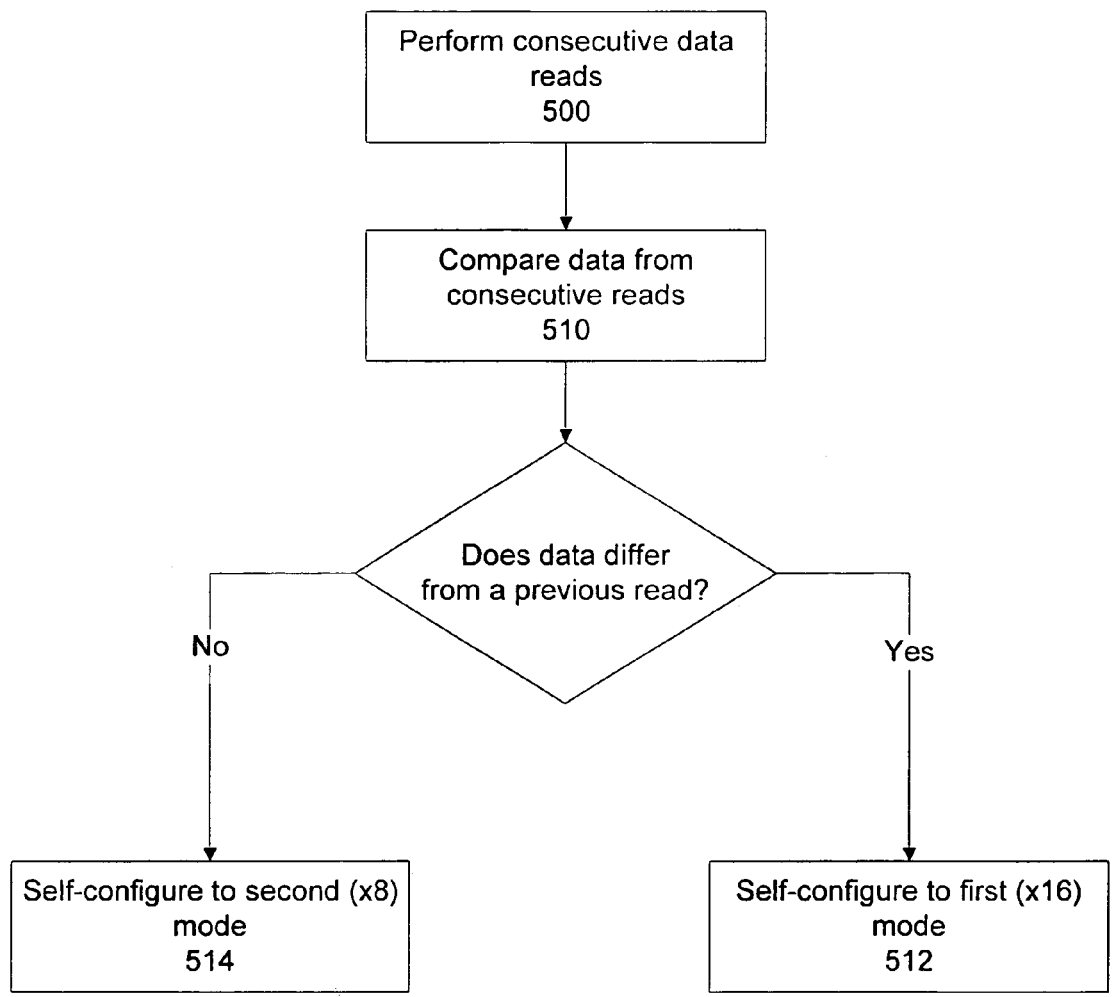
FIG. 5 is a flowchart showing a preferred method for determining the bit width of a data bus.

Referring to FIG. 5, to determine the data bus width of the memory device, the NIC 214 performs 16 consecutive reads starting from address location zero at step 500 and compares the upper 8 bits of the data returned from the reads at step 510. If during any of the 16 reads, the most significant byte of the data differs from that of the previous read, the NIC 214 self-configures to x16 mode at step 512. It follows that if the MSB from the 16 reads never differs, it sets itself up in the 8-bit mode at step 514.

The preferred embodiment conveniently uses 16 reads at step 500, because the interface is reading from a jump table and 16 reads covers the entire table in the pre-programmed flash memory. The process needs sufficient reads for bus width selective accuracy, otherwise the system will fail to boot. Thus, for maximum accuracy, and therefore higher reliability, it is advantageous to perform 16 reads in the data bus width detection process. However, it will be appreciated that a greater or lesser number of reads may also work effectively. For example, two reads may be sufficient in which at least one bit of one data word read differs from the corresponding bit of the other data word read (i.e., a bit of a data word being effectively toggled with respect to its corresponding bit in the other data word).

It should be noted that the data bus width detection method will not work on a blank NAND flash memory 116 (i.e., one that has not previously been loaded) or any NAND flash memory 116 that is not able to change the state of its output bits. Preferably the flash memory is programmed before being installed into the data processing device 10.

Figure 6:
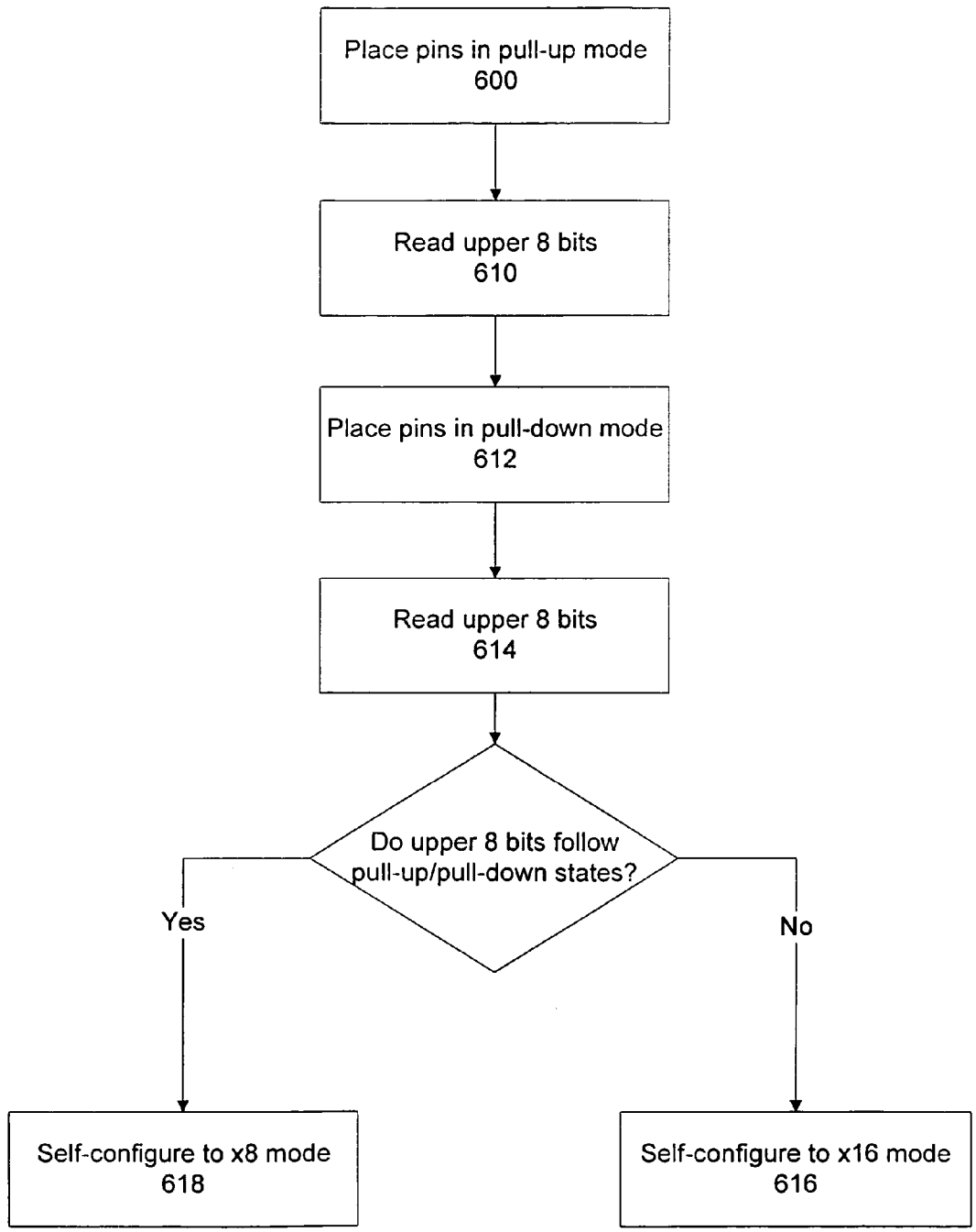
FIG. 6 is a flowchart showing a further preferred method for determining the bit width of a data bus.

Turning to FIG. 6, in an alternate embodiment of the system, the programmable pull up/down pins on the NAND data interface 321 are placed in the pull up mode at step 600 and the high 8 bits of data (for example an ID) are read from the NAND flash memory 116 at step 610; then the programmable pull up/down pins 231 on the NIC 214 are placed in pull down mode at step 612 and the same 8 bits of data are read from NAND flash memory 116 again at step 614. If the high 8 bits follow the pull up/down states, then the NAND flash memory 116 is determined to be 8 bits at step 618, otherwise the device is determined to be 16 bits at step 616. This could be the first operation performed by the memory interface control 200 following reset.

The present system may be practiced in a variety of ways. For example, any bit pattern, even a single bit, may be used to determine data bus width mode. For example, the most significant bit or the two most significant bits may be used. Bit patterns that are prohibited in one mode but acceptable in the other mode may be used to differentiate modes. There may be a 32-bit mode as well as either or both of an 8-bit mode and a 16-bit mode. Dedicated testing patterns may be written to and then read from the NAND flash memory 116. Although the present system has been described in terms of NAND flash memory, other types of memory might be used.

Figure 7:
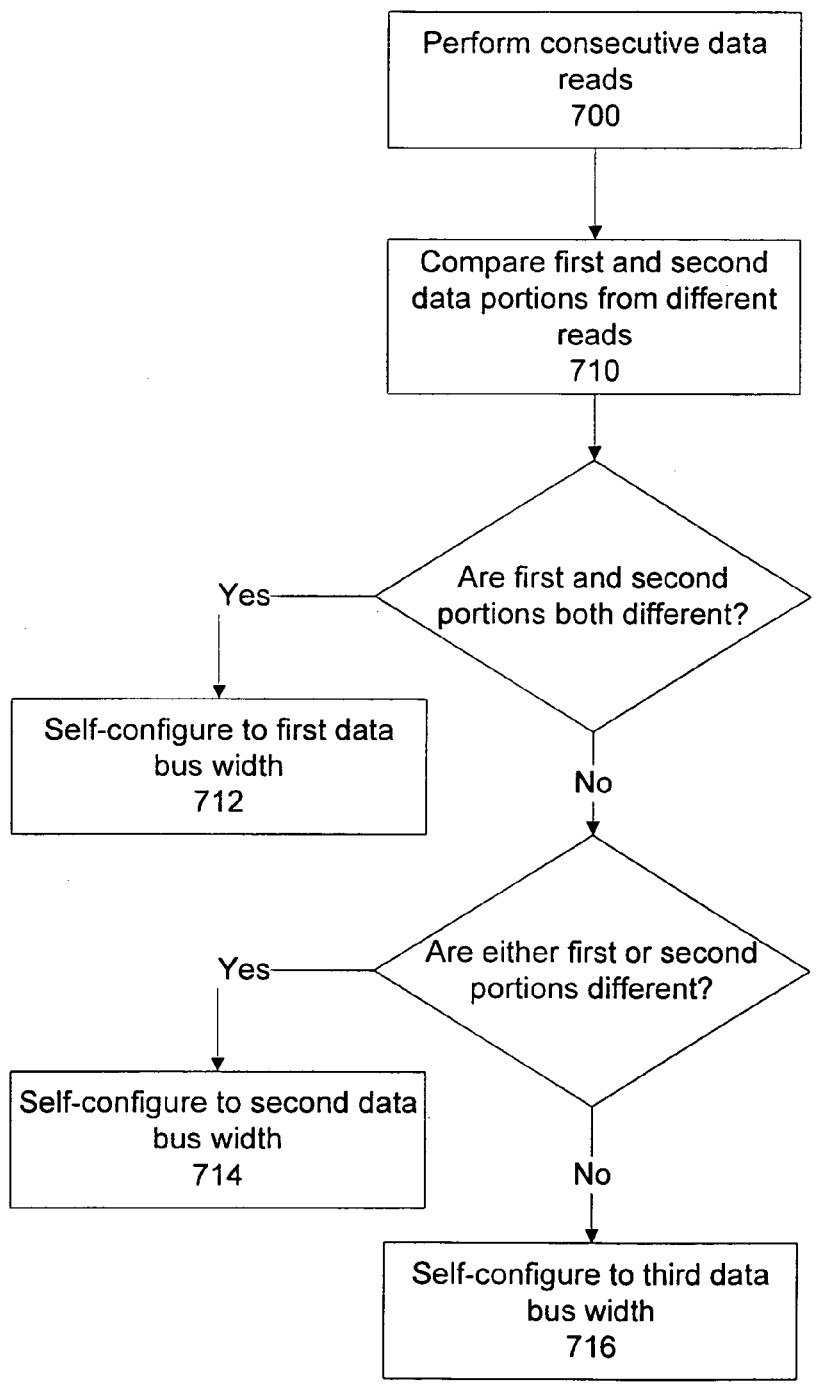
FIG. 7 is a flowchart showing another embodiment of a method for determining the bit width of a data bus.

In an embodiment of the present invention, the plurality of data reads are data reads from a jump table. As shown in FIG. 7, in another embodiment of the present invention, the bit width of a data bus is automatically detected by performing a plurality of data reads 700, and comparing first and second portions of data from one of the plurality of data reads with data from another of the plurality of data reads 710; if a first portion and a second portion of the data of the one and the another of the data reads are different, then configuring to a first data bus width 712; if the first portion of the data of the one and the another of the plurality of data reads is different and the second portion of the data of the one and the another of the another of the plurality of data reads is the same, then configuring to a second data bus width 714; and if the first portion and the second portion of the data of the one and the another of the plurality of data reads are the same, then configuring to a third data bus width 716.

In another embodiment of the present invention, the bit width of a data bus is automatically detected by performing a plurality of data reads; comparing data from the plurality of data reads; if a first portion and a second portion of the data is different in any of the plurality of data reads from that of the others of the plurality of data reads, then configuring to a first data bus width; if the first portion of the data is different in any of the plurality of data reads from that of the others of the plurality of data reads and the second portion of the data of the plurality of data reads is the same for all of the plurality of data reads, then configuring to a second data bus width; and if the first portion and the second portion of the data is the same for all of the plurality of data reads, then configuring to a third data bus width. The portion size may be a byte, a nibble, a bit, or a plurality of bits. The portion is preferably the most significant portion of the data read, but may be another portion and need not consist of contiguous bits. For example, in a sixteen bit word having bit positions from 0 to 15, the portion may consist of bit positions 14, 10, and 8. Other variations of a portion are clearly contemplated by the present invention. In the case where there is a plurality of data reads, the first data read may occur during a pull down operation and the second data read may occur during a pull up operation, or vice versa.

Various embodiments of the present system having been thus described in detail by way of example, it will be apparent to those skilled in the art that variations and modifications may be made without departing from the invention. The invention includes all such variations and modifications as fall within the scope of the appended claims.

We claim:

1. A method of automatically detecting a bit width of a data bus, comprising the steps of:
   a. performing a plurality of data reads at different addresses from a previously loaded memory,
   b. comparing at least some of the plurality of data reads to others of the plurality of data reads, and c. i) if a portion of data remains the same in each of the compared plurality of data reads, configuring to a first data bus width, or
ii) if a portion of data does not remain the same in any of the compared plurality of data reads, configuring to a second data bus width, wherein the first data bus width is not a same size as the second data bus width.

2. The method of claim 1, wherein the portion of data is a most significant portion of data.

3. The method of claim 1, wherein the portion of data is a selection of noncontiguous bits.

4. The method of claim 2, wherein the plurality of data reads comprises a plurality of consecutive reads starting from address location zero.

5. The method of claim 4, wherein sixteen data reads are performed.

6. The method of claim 2, wherein the plurality of data reads comprises sufficient data reads to determine that the most significant portion of one of the plurality of data reads differs from the most significant portion of a previous one of the plurality of data reads.

7. The method of claim 2, wherein the first data bus width is the maximum data bus width.

8. The method of claim 7, wherein the step of comparing at least some of the plurality of data reads to others of the plurality of data reads comprises the step of determining the size of the data portion that differs between two of the plurality of data reads, and the second data bus width is the size of said data portion.

9. A computer program device operative to implement the method of claims 1, 2, 3, 4, 5, 6, 7, or 8.

10. A system for automatically detecting the bit width of a memory data bus comprising:
a memory controller interface in communication with the processor;
a memory device in communication with the memory controller interface, the memory device comprising a data bus, the memory device having been previously loaded;
the memory controller interface being configured to perform a plurality of data reads on the memory device at different addresses such that if a portion of data remains the same in any of the compared plurality of data reads, the memory controller interface self-configures to a first data bus width, and if the portion of data does not remain the same in each of the compared plurality of data reads, the memory controller interface self-configures to a second data bus width, wherein the first data bus width is not a same size as the second data bus width.

11. The system of claim 10 wherein the first data bus width is 8 bits, and a second data bus width is 16 bits, and further wherein the memory controller interface is configured to compare most significant bit of each of the plurality of data reads obtained for each data read, such that the most significant portion changes between two consecutive data reads of the plurality of data reads, the memory controller interface self-configures to the second data bus width, and if the most significant portion does not change, the memory controller interface self-configures to the first data bus width.

12. The system of claim 10 wherein the memory controller interface is hardcoded into a processor.

13. The system of claim 10 wherein the memory device is NAND flash memory.

14. The system of claim 10 wherein the portion of data is a single bit.

15. The system of claim 10 wherein the portion of data comprises a plurality of most significant data bits.

16. A method for automatically detecting a bit width of a data bus, comprising the steps of:
a. performing a plurality of data reads,
b. comparing a first portion and a second portion of at least seine of the plurality of data reads to others of the plurality of data reads, and
c. i) if a first portion and a second portion of data in one of the plurality of data reads is different from the first portion and the second portion of data from another of the plurality of data reads, configuring to a first data bus width;
ii) if a first portion of data in one of the plurality of data reads is different from the first portion of data from another of the plurality of data reads, and a second portion of data from the one of the plurality of data reads is the same as the second portions of data from the remaining of the plurality of data reads, configuring to a second data bus width; and
iii) if a first portion and a second portion of data for is the same as the first portions and second portions of data from the remaining of the plurality of data reads, configuring to a third data bus width.

17. A computer program product operative to implement the method of claim 16.

* * * * *

UNITED STATES PATENT AND TRADEMARK OFFICE
CERTIFICATE OF CORRECTION

PATENT NO. : 7,320,045 B2  
APPLICATION NO. : 11/048761  
DATED : January 15, 2008  
INVENTOR(S) : Randell et al.

Page 1 of 1

It is certified that error appears in the above-identified patent and that said Letters Patent is hereby corrected as shown below:

Col. 10 Line 27, "seine" should read --some--.

Signed and Sealed this

Fourth Day of November, 2008

JON W. DUDAS  
*Director of the United States Patent and Trademark Office*